United States Patent [19]

Whetstone

[11] Patent Number: 4,482,784
[45] Date of Patent: Nov. 13, 1984

[54] POSITION DETERMINATION DEVICE

[75] Inventor: Albert L. Whetstone, Stratford, Conn.

[73] Assignee: Summagraphics Corporation, Fairfield, Conn.

[21] Appl. No.: 344,874

[22] Filed: Feb. 1, 1982

[51] Int. Cl.³ ............................................. G08C 21/00
[52] U.S. Cl. ..................................... 178/19; 367/156; 333/148
[58] Field of Search ................ 178/18, 19; 340/870.4; 346/139 C; 367/907, 168, 156, 153, 149; 333/138, 148; 33/1 M

[56] References Cited

U.S. PATENT DOCUMENTS 4,273,954 6/1981 Takeuchi et al. ...................... 178/19
4,298,772 11/1981 Kobayashi et al. ............... 178/19 X Primary Examiner—Stafford D. Schreyer
Attorney, Agent, or Firm—Daniel M. Rosen

[57] ABSTRACT

A position determining device has two perpendicular longitudinal magnetostrictive elements. A grid of a plurality of closed loop conductors has two parallel straight legs which form the grid. A flux producing element inductively coupled to at least one of said grid conductors causes an electrical current in that conductor. In turn that current induces a strain wave in the magnetostrictive element. Near the end of the magnetostrictive element is a sensing means to detect the strain wave comprising a lumped inductive capacitive delay line substantially having a plurality of evenly spaced inductive coils aligned with the magnetostrictive elements.

The lumped delay line is defined by the formulas $$wv = \sqrt{LC}$$

$$Z = \sqrt{L/C}$$

$$c = C/n$$

where w is the overall length of the delay line; L is the total inductance, C is the total capacitance, Z is the terminating impedance, c is capacitance of the capacitance associated with each coil, and n is the number of coils.

15 Claims, 5 Drawing Figures

POSITION DETERMINATION DEVICE

FIELD OF THE INVENTION

This invention relates to position determination devices, and more particularly, to coordinate digitization employing strain wave vibrational mode transmission and reception.

BACKGROUND OF THE INVENTION

Graphic data devices are commonly employed in areas such as facsimile transmission and computer data input. Earlier forms of such devices employed a stylus or cursor in the form of a writing implement or pointer device mechanically coupled to a set of arms for translating the movement thereof into a sequence of usable information signals. Such arrangements proved unsatisfactory in that undesirable frictional and inertial limitations reduced accuracy. One variation of the foregoing arrangement employed a sheet resistance material to provide an X/Y coordinate indication, but such devices often presented resolution and uniformity problems giving rise to erroneous information. Other forms, such as light pens, may provide graphical data. But they require interaction with cathode ray display tubes and thus are limited in usefulness. One attempt made to overcome the difficulties has been the employment of a sonic transducing coordinate digitizer requiring some form of acoustic transmission, either through the atmosphere or through the surface to set a receptor or like devices. The signal source can be a vibrational or sonic wave generation device. The vibrational device operates conventionally by the use of a tuned crystal generator and pick-up devices acoustically coupled to the sub-surface of a two dimensional digitizing area. The accuracy of tuning is important in such devices and requires extensive constructional detail and expensive components.

The sonic wave generation devices rely upon atmospheric transmission of a sound wave generated at the location determined by the sound source with respect to the sound receivers. Use of atmospheric transmission, however, has proven to give rise to inaccuracy, non-uniformity and loss of resolution as a result of variation in effective ambient conditions. The speed of sound will vary considerably over temperature range, and is necessary to provide some means of temperature compensation in order to provide accurate reproducibility of coordinate digitization using an atmospheric transmission system. In addition, the atmospheric transmission system is subject to Doppler effect error and propagation time error due to draft conditions, and to external noise conditions, all resulting in erroneous information. Finally, atmospheric transmission systems require a specific sound source, which often proves objectionable from a noise level viewpoint, as well as in providing certain discomfort and inconvenience, particularly in light of the requirement of an audible sound source to be positioned at the tip of a writing stylus handheld by an operator.

Another alternative has been an array of embedded wires positioned in a data surface or subsurface along X/Y coordinates. In the embedded wire system, the stylus provides some means for generating a magnetic field, which is picked up in the location corresponding to the closest coordinate intersection of the X/Y position in the subsurface. The signal thus transduced into the data surface wire array is picked up by means of a suitable receptor located at the end of the respective wires and the position of the respective wires is thereafter digitized. Conventional means for accomplishing the foregoing have employed digital logic circuitry responsive to the presence of induced pulses along the appropriate X/Y wire lines corresponding to the position of the transduced pulses. Unfortunately, this system is not absolute, but rather digitizes only with respect to an initial position.

An alternative to the foregoing form employs the use of delay lines terminating the X/Y array. The time delay required for the pulse induced in an X/Y wire to traverse the delay line from the termination of the respective X/Y wire to a point where a device senses the pulse on the delay is measured, provides a measure of the coordinate location. In the past such delay lines were often ordinary delay cables such as illustrated in U.S. Pat. No. 3,648,277.

Another attempted solution has been to use magnetostrictive lines. These lines can be used either as a substituted for the delay line terminating the array X/Y wires or as the wires in the X/Y array itself. An example of the latter application is U.S. Pat. No. 3,846,580. Unfortunately, the sensing means required to respond to the vibrational signal on the magnetostrictive line has presented problems. Either the pick up is too sensitive and detects noise or is not sufficiently sensitive to adequately detect the propagating vibrational signal. Another problem is that magnetostrictive tablets require that they be periodically wiped with a permanent magnet to initialize the magnetostrictive wires. This wiping operation also had to be performed when any magnetic material came too near the tablet and created a dead spot.

It is therefore an object of the present invention to provide an improved coordinate data device.

It is another object of this invention to provide a coordinate data device employing pulse generation and pick up on absolute coordinate basis.

It is a further object of the invention to employ prior art magnetostrictive techniques with an improved signal sensing device.

It is another object of this invention to provide such an improved signal sensing device for a coordinate data device having higher accuracy and more reliability than those heretofor available at an economical cost.

The foregoing objects are realized in a position determining device with the provision of array of plurality of transmission data. Transmission media preferably consist of an array of closed loop wire conductors arranged along a horizontal or X axis and a further array of closed looped wire conductors arranged along a vertical or Y axis. A stylus or cursor movable over the surface produces a magnetic flux to couple the stylus to the aforesaid wire conductors. When energized the stylus induces an electrical current in the closest of the conductors. A longitudinal magnetostrictive element with its axis transverse to said conductors has induced therein a longitudinal strain wave by electrical current in the conductor. The strain wave propagates along the axis of the magnetostrictive element. Near the end of the magnetostrictive element is sensing means for generating an arrival signal in response to the strain wave traversing its location. In particular the sensing means includes a lumped inductive-capacitive delay line substantially aligned with the magnetostrictive delay line. The delay in the lumped delay line is adjusted to be equal to the delay of the magnetostrictive line over the distance of magnetostrictive line which is covered by the lumped delay line. The lumped delay line is defined by the formulas $$T_d = \frac{W}{V}$$

where $T_d$ is the delay time in the lumped delay line, V is the velocity of sound in the magnetostrictive element, W is the length of the lumped delay line, and $$Z = \sqrt{L/C}$$

where Z is the delay line's terminating impedance, L is the total inductance of the delay line and C is the total capacitance of the delay line.

The foregoing objects and brief description as well as further objects, features and advantages of the present invention will become more apparent from the following description with reference to the attached drawings.

DETAILED DESCRIPTION

The operation of the present invention evolves about the employment of the longitudinal vibration mode of strain wave propagation. The specific implementation is by means of electrical current induction into a plurality of electrical wires arrayed about a data surface in an X/Y coordinate pattern. The array will actually be positioned slightly below the plane of the data surface, but for purposes of this description data surface shall mean the area operative in conjunction with the array for digitizing.

Figure 1:
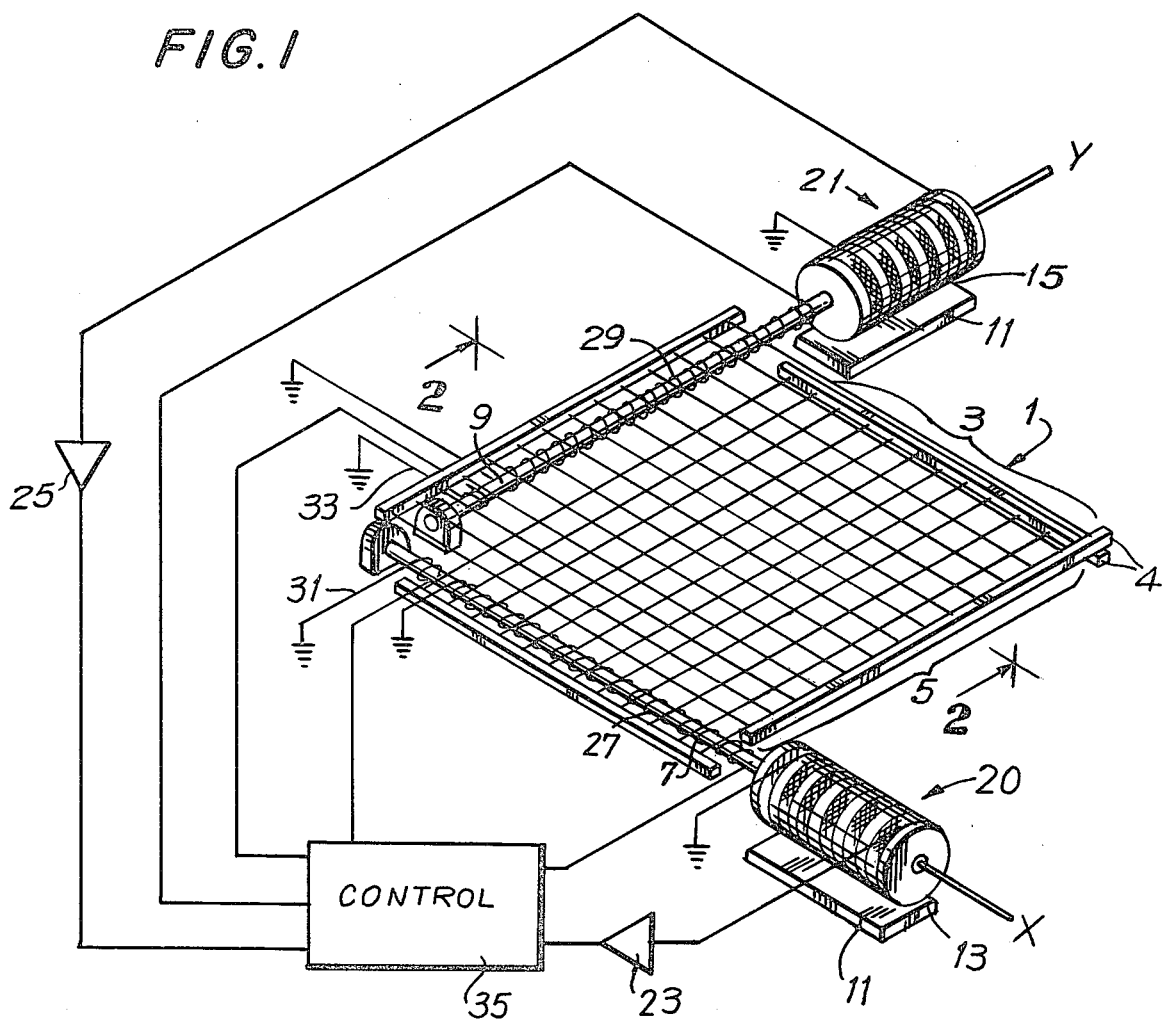
FIG. 1 is a schematic array of the present invention illustrating the relationship between the wire array and the magnetostrictive delay line.

Referring now to FIG. 1, the digitizer board illustrated as 1 is provided with the first plurality of wires 3 arranged in parallel fashion along the vertical or Y axis of the data surface. A second plurality of a horizontally arranged wires 5 correspond to the X axis. Positioned along the bottom edge of digitizer board 1 is a horizontally oriented magnetostrictive wire 7, while along the lefthand edge of the digitizer board 1 is a vertically oriented magnestrictive wire 9.

In the preferred embodiment each of wires 3 and 5 may be made from copper or other conductor and form a closed loop with a portion of that loop lying parallel to and above the magnetostrictive wires 7 and 9. In the preferred embodiment each of wires 3 and 5 are straight conductors, each of which is soldered into two other conductors 4 parallel to magnetostrictive wires 7 or 9, respectively, one in the near neighborhood of the magnetostrictive wire and the other at the other end of the respective wire 3 or 5. As will be clearer from the description below, when cut by a magnetic flux, a current that is inductively induced into wires 3 and 5 causes a strain wave to arise and propagate in magnetostrictive wires 7 and 9.

X/Y wires 3 and 5 may be ordinary conductors such as copper. The magnetostrictive wires 7 and 9 are typically of a composition which exhibits magnetostrictive properties. One example of a composition is a iron chromium vanadium alloy such as is manufactured under the trade name Remendur P by the Wilbur Driver Manufacturing Company of New Jersey. Another alloy under the trade name Permendur is manufactured by the Allegheny Ludlum Corp. of Pittsburgh, Pennsylvania.

Each of magnetostrictive wires 7 and 9 is affixed to digitizing board 1 by damping blocks 11. As one skilled in the art will recognize damping blocks 11 tend to prevent reflections of longitudinal vibrations on magnetostrictive wires 7 and 9. However, magnetostrictive wires 7 and 9 could be affixed to digitizing board 1 by other means, such as soldering, since the operative principle of the present invention does not require magnetostrictive wires 7 and 9 be electrically isolated.

Figure 2:
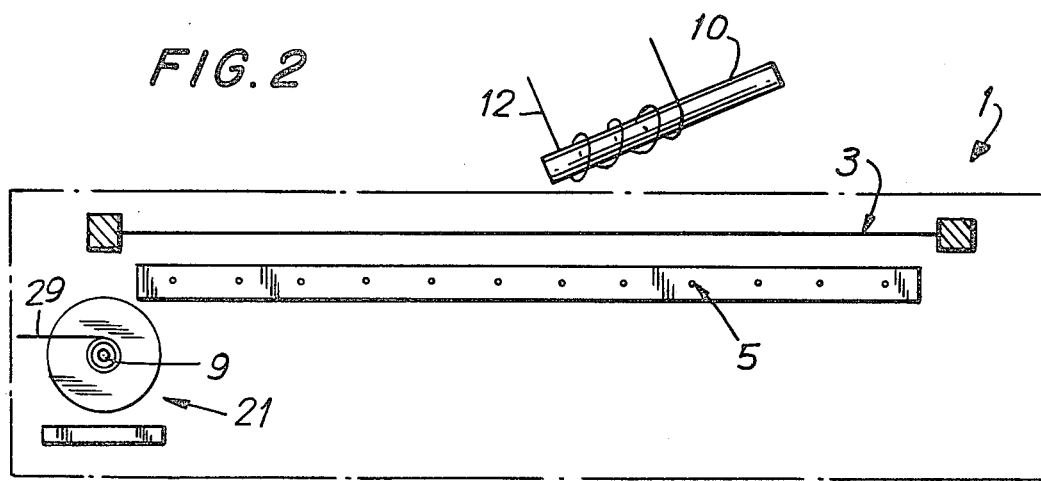
FIG. 2 is a detail of the relationship between the field generation device and the wire array.

The construction of the array is illustrated in greater detail in FIG. 2. The position field generating device 10, a stylus or cursor, includes a toroidal coil 12 of conventional conductive wire such as copper or the like, positioned at or near the edge of the device 10. For purposes of increasing the intensity of the field the core of the device 10 may be constructed of a ferrite magnetic material, and wire may be wound with 10 or 15 turns about the core.

Near one end of and axially aligned with each of magnetostrictive wires 7 and 9 are permanent magnets 13 and 15, respectively. Sensing means 20 and 21 are placed directly above magnets 13 and 15 and are more fully illustrated in FIGS. 2 and 3. Sensing means 20 and 21 generate an arrival signal in response to the arrival of the longitudinal strain wave induced in their respective magnetostrictive wire 7 or 9 by an electrical pulse induced into X/Y wires 3 and 5.

Each of sensing means 20 and 21 are connected to output devices 23 and 25. As one skilled in the art fully appreciates output devices 23 and 25 detect the arrival signal.

In operation a longitudinal mode vibration travels down magnetostrictive element 7 until it reaches the area of sensing means 20. The strain on the element causes a change in permeability which results in a changing flux field, inducing a voltage in sensing means 20. Although not necessary to operation, the magnet 13, by providing a permanent flux field, serves to provide a higher signal to noise ratio because it produces a higher flux in the near neighborhood of sensing means 20.

Also the preferred embodiment provides initializing coils 27 and 29. Through coils 27 and 29 pass magnetostrictive wires 7 and 9, respectively. Prior to pulsing the cursor on device 10 a pulse is sent through coils 27 and 29. A magnetic field is created that uniformly and automatically initializes magnetostrictive elements 7 and 9.

Also shown in FIG. 1 are fiducial coils 31 and 33. These coils are wound around magnetostrictive elements 7 and 9, respectively, a known distance from sensing means 20 and 21. As will be appreciated by one skilled in the art fiducial coils 31 and 33 can be used to calibrate digitizing board 1. That is, by pulsing fiducial coils 31 and 33, and since the distances between 31 and 33 and sensing means 20 and 21, respectively, are known, a correspondence in the digitization can be either automatically or manually attained.

As also seen in FIG. 1 all leads from digitizing board 1 feed into control 35. Control 35 produces the required pulses to energize stylus 10 to induce a current into the nearest of conductors 3 and 5. It also measures the time from that pulse until sensing means 20 and 21 sense the strain wave on their respective magnetostrictive elements. Further control 35 produces both the initializing pulses and fiducial pulse consistent with the above description. Since logic to implement these functions are well known, it is not here described. For example, U.S. Pat. Nos. 3,846,580 and 3,648,277 are prior art digitizers which utilize analogous logic, the respective disclosures of which are specifically incorporated by reference herein.

Figure 3:
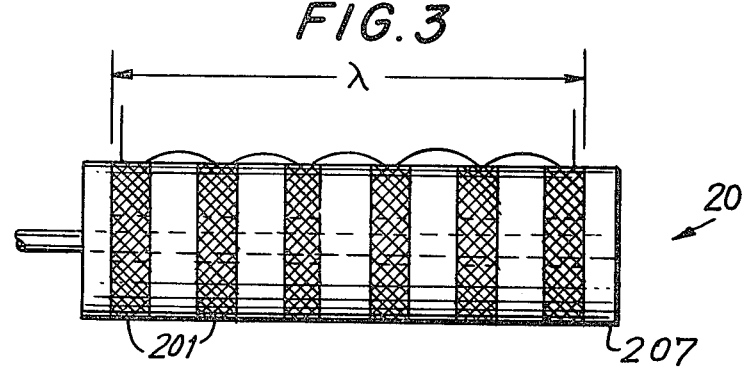
FIG. 3 is a representation of the sensing means of the present invention.
Figure 4:
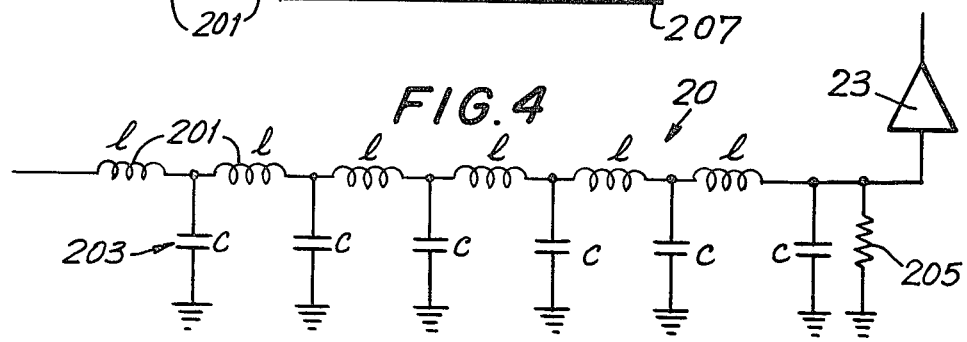
FIG. 4 is a schematic of the sensing means of the present invention.

Referring now to FIGS. 2 and 3 the physical and electrical configuration of sensing means 20 and 21 can be seen. Sensing means 20 in the preferred embodiment is a lumped inductive-capacitive delay line. It consists of a series of serially connected coils 201 wound on a spool 207 at equal intervals. Associated with each of the coils 201 is a capacitor 203 connected between coils 201 and ground (not shown in FIG. 3). Terminating lumped delay line 20 is a resistor 205.

Figure 5:
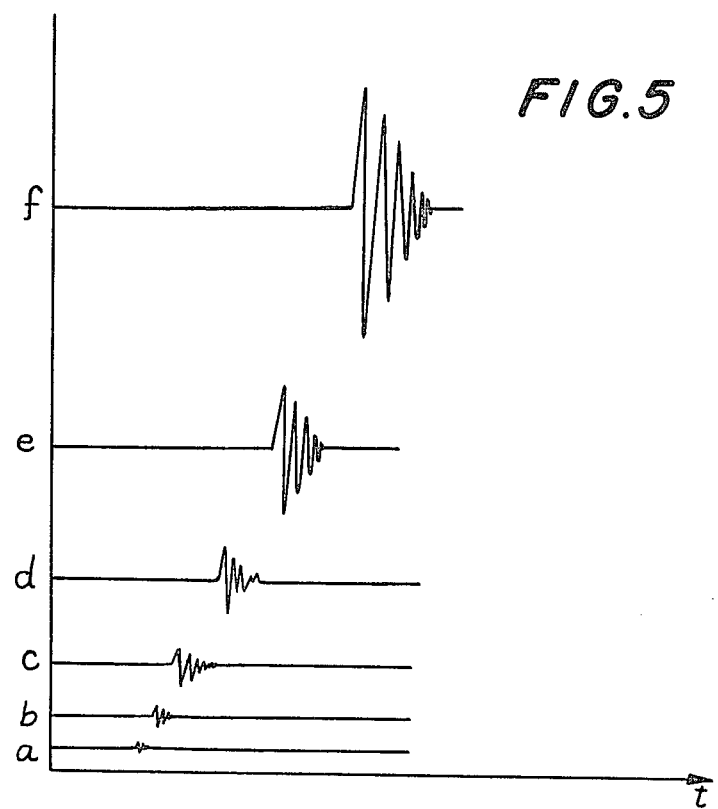
FIG. 5 is a pictorial representation of the signals sensed at various stages of the sensing means of the present invention.

The operation of delay line 20 can best be understood by considering each stage (one coil 201 and capacitor 203) as an individual pickup. The outputs of each pickup by addition reinforces the signal due to the longitudinal strain wave on the magnetostrictive element as the wave passes a particular stage of the lumped delay line. Referring to FIG. 5 the operation of the present device is seen. The first wave "a" is the signal sensed between the first coil 201 and ground; wave "b" is the signal sensed between the second coil 201 and ground; and so forth until wave "f" is signal sensed between the last coil and ground or the signal that forms the input to output devices 23 or 25.

Accordingly, the electrical delay of each stage of delay line 20 must exactly match the time it takes for the strain wave to traverse the magnetostrictive element through the stage. Accordingly, $$T_d = W/V \tag{1}$$

where $T_d$ is the total time delay of that portion of the magnetostrictive delay line within the lumped delay line 20, and V is the velocity of the longitudinal strain wave on the magnetostrictive wire. (The longitudinal vibration on the wire travels at the speed of sound through wire. That speed is determined in proportion to the square root of the ratio between Young's modulus and the bulk wire density. In an iron, chromium, vandium composition alloy such as Remandur P described above, the velocity will be nominally 5,000 meters per second or 5 millimeters per nanosecond).

Similarly, it is well known the delay time of the lumped line is given by the formula $$T_d = \sqrt{LC} \tag{2}$$

where L is the overall impedance and C is the overall capacitance. With a given inductance, and by combining formulas 1 and 2 the capacitance may be determined:

$$C = \frac{(T_d)^2}{L} = \frac{(WV)^2}{L} \tag{3}$$

Each of the individual conductors and capacitors will have a capacitance and inductance as defined as follows:

$$l = \frac{L}{n} \tag{4}$$

$$c = \frac{C}{n} \tag{5}$$

where n equals the number of stages in lumped delay line 20. To insure that there are no reflections generated by lumped delay line 20, it is terminated by resistor 205 having a resistance R equal to the characteristic impedence of delay line 201, or $$R = \sqrt{L/C} \tag{6}$$

EXAMPLE 1

According to the present invention as explained above the nominal velocity of a longitudinal strain wave in the preferred magnetostrictive wire is 5 millimeters per microsecond. Taking a lumped LC delay line having overall length W of 17.6 millimeters and including 6 inductor coils equally spaced in accordance with FIG. 2, it is found that $$T_d = W/V = \frac{17.6 \text{ mm}}{5 \text{ mm/ms}} = 3.52 \text{ ms} \tag{7}$$

Given a total inductance for the lumped LC delay line of 10.33 millihenrys the capacitance is calculated:

$$T_d = \sqrt{LC} \tag{8}$$

$$C = \frac{(T_d)^2}{L} = \frac{(3.52 \text{ ms})^2}{10.33 \text{ mH}} = 1200 \text{ pf}$$

Similarly, $$R = \sqrt{L/C} = 3000 \text{ ohms} \tag{9}$$

Each capacitor and inductor has the following values:

$$l = \frac{L}{n} = \frac{10.33}{6} = 1.72 \text{ mH} \tag{10}$$

$$c = C/n = \frac{1200 \text{ pf}}{6} = 200 \text{ pf} \tag{11}$$

One skilled in the art will recognize that, although the calculations above have generally been made to at least three significant figures, such accuracy is not necessary. Indeed, it has been found that this present invention achieves its goals if the accuracy is maintained to within 10% of values.

Digitizing board 1 operates in the conventional manner. Control 35 pulses field generating device 10. The resulting magnetic field induces a current in respective wires 3 and 5. That current induces a longitudinal strain wave in the magnetostrictive elements 7 and 9. That wave propagates along the elements 7 and 9 at the speed of sound and is detected by sensing means 20 and 21, and amplified through the pick-up unit 23 and 25. The time the wave takes to propagate along elements 7 and 9 is proportional to the location of field generating means 10. Control 35 measures this time.

While the invention has been herein described with reference to a particular embodiment and example, one skilled in the art will readily recognize various modifications and changes without deviating from the present invention. For example, although the present invention has been illustrated in use with a digitizing board, the longitudinal mode wave detector is equally applicable to other applications where longitudinal wave transmission is utilized, such as satellite communication. Also, although sensing means 20 has been shown using six stages of coils, various other numbers could readily be used. In tablets smaller than that of the above example fewer stages would be appropriate and with tablets larger than the above examples more stages would be appropriate. Another variation could be to excite the magnetostrictive elements and sense the time from cursor 10.

What is claimed is:

1. An automatic coordinate determining device comprising:
    a tablet having a grid of parallel spaced electrical conductors;
    a longitudinal magnetostrictive element with an axis transverse to said conductors;
    a device movable over the surface of said tablet and including a flux producing element inductively coupled to at least one of said parallel conductors;
    means for energizing said flux producing element to induce an electrical current in said one conductor, said current in turn inducing a first strain wave in said magnetostrictive element at a region adjacent said one conductor, said strain wave being propagated along the axis of said magnetostrictive element; and
    sensing means comprising a delay line for producing an output in response to said strain wave, said delay line including a plurality of serially connected inductive coils inductively coupled to said magnetostrictive element, a capacitor coupling each of said plurality of inductive coils to a common reference potential, and terminating impedance connecting the last of said plurality of inductive coils to said common ground.

2. An automatic coordinate determining device as in claim 1 where said sensing means includes a lumped inductive capacitive delay line substantially represented by $$LC = (wv)^2$$

where w is the overall length of the sensing means, v is the velocity of sound in the magnetostrictive element, L is total inductance of the sensing means, and C is total capacitance of sensing means.

3. An automatic coordinate determining device as in claim 2 including a terminating impedance substantially represented by $$Z = \sqrt{L/C}$$

where Z is the terminating impedance.

4. An automatic coordinate determining device as claimed in claim 3 wherein said sensing means comprises a plurality of coils each having substantially the same inductance and evenly spaced along said sensing means, and a capacitor associated with each of said coils and substantially represented by $$c = (C/n)$$

where c is the capacitance of said capacitor, and n is the number of said coils.

5. An automatic coordinate determining device as in claim 1 including initializing means.

6. An automatic coordinate determining device as in claim 5 wherein said initializing means includes means to produce a uniform magnetic field in the near neighborhood of said magnetostrictive element.

7. An automatic coordinate determining device as in claim 6 wherein said means to produce a uniform magnetic field includes a wire coil.

8. An automatic coordinate determining device as in claim 7 wherein said magneostrictive element is substantially coincident with the axis of said wire coil.

9. An automatic coordinate determining device as in claim 1 including a fiducial coil to calibrate the device including a wire having a plurality of turns around said magnetostrictive element and means to induce a pulse in said wire.

10. An automatic coordinate determining device as in claim 1 wherein each of said spaced electrical conductors is a portion of a closed loop having one section thereof in parallel to said magnetostrictive element.

11. An automatic coordinate determining device comprising:
    an elongated magnetostrictive element;
    a tablet having an array of a plurality of conductors including two parallel straight conductors joined by a wire, said wire being perpendicular to said two parallel conductors and parallel to and inductively coupled to said magnetostrictive element;
    a device movable over the surface of said tablet and including a flux producing element inductively coupled to at least one of said conductors;
    means for energizing said flux producing element to produce an electrical current in said one conductor, said current in turn inducing a first strain wave in said magnetostrictive element at a region adjacent said wire joining said two conductors; said strain wave being propagated along said magnetostrictive element;
    a sensing means comprising a lumped inductive-capacitive delay line inductively coupled to and substantially aligned with said magnetostrictive delay line for producing an output in response to said strain wave, where the transversal time of said delay line is substantially represented by w v, where w is the overall length of the lumped delay line, v is the velocity of sound in the magnetostrictive element, and wherein the total capacitance C is determined by $$C = \frac{(wv)^2}{L},$$

wherein L is the total inductance of the lumped delay line C is the capacitance of the lumped delay line, and a terminating impedance substantially represented by $$Z = \sqrt{L/C}$$

where Z is the terminating impedance.

12. An automatic coordinate determining device as in claim 11 wherein said lumped delay line comprises a plurality of coils each of substantially the same inductance and evenly spaced along said lumped delay line, and a capacitor associated with each of said coils and substantially represented by $$c = (C/n)$$

where c is the capacitance of said capacitor and n is the number of said coils.

13. A coordinate determining device as in claim 12 including a permanent magnet aligned with said coils.

14. An automatic coordinate determining device comprising:
  a tablet having a first plurality of parallel spaced electrical first conductors and a second plurality of parallel spaced electrical second conductors, the first and second conductors being normal to each other;
  first and second longitudinal magnetostrictive elements having axes transverse of said first and second conductors;
  a device movable over the surface of said tablet and including a flux producing element inductively coupled to at least one of said first and one of said second parallel conductors;
  means for energizing said flux producing element to induce an electric current in said one first and said one second conductor, said current in turn inducing first and second strain waves in said first and second magnetostrictive elements respectively at a region adjacent said one conductor of said first and second pluralities of conductors respectively, said strain waves being propagated along the axes of said first and second magnetostrictive elements, respectively; and
  first and second sensing means each comprising a delay line for producing an output in response to the strain wave of the respective first and second magnetostrictive elements, said delay lines including a plurality of serially connected inductive coils inductively coupled to the respective said magnetostrictive element, a capacitor coupling each of plurality of inductive coils to a common reference potential, and a terminating impedance connecting the last of the plurality of respective inductive coils to said common ground.

15. The automatic coordinate determining device of claim 14, wherein each of said sensing means includes a lumped inductive-capacitive delay line substantially represented by:

$$LC = (wv)^2$$

where w is the overall length of the sensing means, v is the velocity of sound in the magnetostrictive element, L is the total inductance of the respective sensing means, and C is the total capacitance of the respective sensing means.

* * * * *